US009015179B2

(12) United States Patent
Xiaolu et al.

(10) Patent No.: US 9,015,179 B2
(45) Date of Patent: Apr. 21, 2015

(54) MEDIA CONTENT TAGS (75) Inventors: Ye Xiaolu, Shanghai (CN); Han Luming, Shanghai (CN)

(73) Assignee: Oracle International Corporation, Redwood Shores, CA (US)

( * ) Notice: Subject to any disclaimer, the term of this patent is extended or adjusted under 35 U.S.C. 154(b) by 1390 days.

(21) Appl. No.: 11/745,353

(22) Filed: May 7, 2007

(65) Prior Publication Data

US 2008/0281805 A1  Nov. 13, 2008

(51) Int. Cl.
 *G06F 17/30* (2006.01)

(52) U.S. Cl.
 CPC .... *G06F 17/30289* (2013.01); *G06F 17/30017* (2013.01)

(58) Field of Classification Search
 USPC .................................. 707/758, 802
 See application file for complete search history.

(56) References Cited

U.S. PATENT DOCUMENTS

| | | | |
|---|---|---|---|
| 5,864,682 A * | 1/1999 | Porter et al. .................. 709/247 |
| 2006/0136383 A1 * | 6/2006 | Golla ................. 707/3 |
| 2006/0161863 A1 * | 7/2006 | Gallo ............................ 715/810 |
| 2007/0061203 A1 * | 3/2007 | Ellis et al. ........................ 705/14 |
| 2007/0157251 A1 * | 7/2007 | Shrivastava et al. ............. 725/60 |
| 2007/0214488 A1 * | 9/2007 | Nguyen et al. ................. 725/134 |
| 2007/0250901 A1 * | 10/2007 | McIntire et al. ............... 725/146 |
| 2008/0005166 A1 * | 1/2008 | Cragun et al. ............. 707/104.1 |
| 2008/0140385 A1 * | 6/2008 | Mahajan et al. .................. 704/9 |
| 2008/0155627 A1 * | 6/2008 | O'Connor et al. ............. 725/109 |
| 2008/0195468 A1 * | 8/2008 | Malik ................. 705/14 |
| 2009/0013252 A1 * | 1/2009 | DeWitt ........................ 715/716 |

* cited by examiner

*Primary Examiner* — Son T Hoang
(74) *Attorney, Agent, or Firm* — Kilpatrick Townsend & Kilpatrick LLP (57) ABSTRACT

A tag file associated with a content file provides a user with access to related content. A content provider can request that information be associated with selected content, such that when a user views the selected content a selectable element is generated and displayed to the user to provide easy access to the related content. Information such as keywords associated with the selected content also can be used to search for related content. Related content information is placed in tags of the tag file for the selected content, such that at a selected or other appropriate time information relating to the related content is displayed to the user. When a user selects the selectable element, the related content is located and displayed in place of, or in addition to, the selected content. Such an approach is useful for digital media networks such as IPTV applications.

14 Claims, 6 Drawing Sheets

MEDIA CONTENT TAGS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Figure 1:
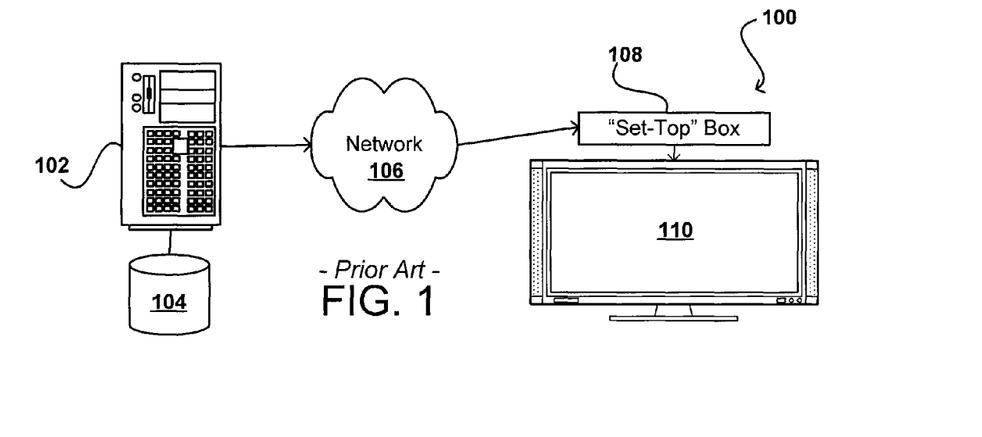
FIG. 1 illustrates a digital content delivery system of the prior art.

As information and media content is increasingly being delivered through digital networks, such as via the Internet, digital video delivery networks, digital cellular networks, etc., new delivery mechanisms are being used to allow users to access desired content. For example, the recent advent of Internet Protocol Television (IPTV) allows digital video to be delivered to a set-top box (or directly to a television, etc.) over a broadband or other digital network connection. The ability to deliver video and other content over a digital network allows for bi-directional communication, such that a user can select content "on demand" by viewing a main control menu that is displayed on the television, cell phone, or other viewing device. For example, FIG. 1 shows an arrangement 100 wherein a content server can provide content, stored in a storage mechanism such as a database 104, through a broadband cable network 106 to a "set-top" box 108 for display on a television 110, and the viewer can select content for viewing via the television 110 and set-top box 108.

Services such as IPTV, however, do not allow the level of access and control that users are coming to expect from other digital information sources such as the World Wide Web. For example, if a user is watching a movie over IPTV and sees a product that interests the user, the user would have to stop the movie or wait until after the movie then connect via a Web browser to the Internet to search for the product. This has a number of disadvantages, as the user might not obtain enough information through a quick viewing to be able to locate the product even through a Web search. Further, the user might not remember to look up the information after the movie. There also are disadvantages to advertisers and companies in charge of the product placement in the movie, as the potential customer is not able to easily and immediately obtain information about that product or service, and thus potential sales might be lost.

Also, a user viewing content about a subject of interest might want to learn more about that topic. In existing IPTV approaches, the user would have to go back to a main menu and scroll through the options to determine if any related content is available. Otherwise, a similar problem occurs as discussed above in that the user must either stop viewing the content or wait until the content is done playing to access the Internet and search the Web for additional information.

There are many other content delivery and access opportunities that are being missed by not taking advantage of the power of existing digital connections as opposed to previous over-the-air, unidirectional analog signals.

BRIEF SUMMARY OF THE INVENTION

Systems and methods in accordance with various embodiments provide access to related content through the use of content tags. For example, a selected content file might have related content that can be associated with the selected content file so that a user accessing the selected content can also easily access the related content. In one set of embodiments, a tag is generated that includes information for the related content. This tag then can be inserted into a tag file associated with the selected content file. The tag can take the form of an XML tag, with associated information, in an XML tag file. When a user subsequently selects the selected content, such as for viewing over an IPTV connection, the tag file also will be sent with the selected content. The selected content and associated tag file will be received by a receiving device for the user, which publishes the content to a display device. The receiving device can parse and interpret the tag file to determine the appropriate tag information.

During the display of the selected content file, the receiving device can generate an on-screen display to display on the receiving device along with the selected content. The on-screen display can include at least one selectable element, such as a link or button, which allows the user or viewer to access the related content from the tag information. When a user selects a selectable element, a request is sent to the content provider. The information in the request is used by the content provider to locate the related content and send that related content to the receiving device for display to the user. The related content can be displayed in place of the selected content, or in a separate window on the display device that allows the selected content to continue being displayed.

The related content can be provided by a content provider, such as a merchant, advertiser, or programming service. The related content also can be provided, manually or automatically, by determining related content using methods such as keyword or category searches. The selectable elements then can allow a user to navigate to information, view related content, or view product information related to the selected content being displayed. In an IPTV context, for example, a user can easily navigate to information relating to a program being viewed. The selectable elements can be generated in real-time as needed to be displayed along with the selected content.

In one embodiment this functionality is provided by a tag management system that includes a tag generator operable to generate tags including information for the related content. A tag manager is used to include the tag in a tag file associated with the selected content. A distribution server then can distribute the tag file with the selected content upon a request for the selected content. The tag file is interpreted by a receiving device such as a set-top box, such that a selectable element associated with the tag in the tag file is generated for display with the selected content on a display device. Selection of the selectable element causes the receiving device to generate a request that is received by the distribution server, whereby the distribution server locates the related content and sends the related content to the receiving device for display to the user.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments of the present invention overcome the aforementioned and other deficiencies in existing content delivery and access systems by providing new and improved ways to locate and access related content. In various embodiments, an on-screen display mechanism is used to provide at least one access element for accessing content related to that which is currently being displayed on the display mechanism. The access element can be generated in real-time and can be displayed whenever currently-displayed content has related content available for the user to access. In one set of embodiments, a tag is placed in the digital content stream whenever there is related content that can be accessed. When a content transfer component such as a digital cable box or other digital media receiving device locates the tag in the digital stream, the box can decode and/or interpret the tag and display information to the user or viewer(s) of the display device. The displayed information can include a brief description of the related content, and at least one access element allowing the user to access that content. When the user selects an access element, the related content associated with that element can be displayed on the device, in place of or in addition to the content currently being displayed.

Figure 2:
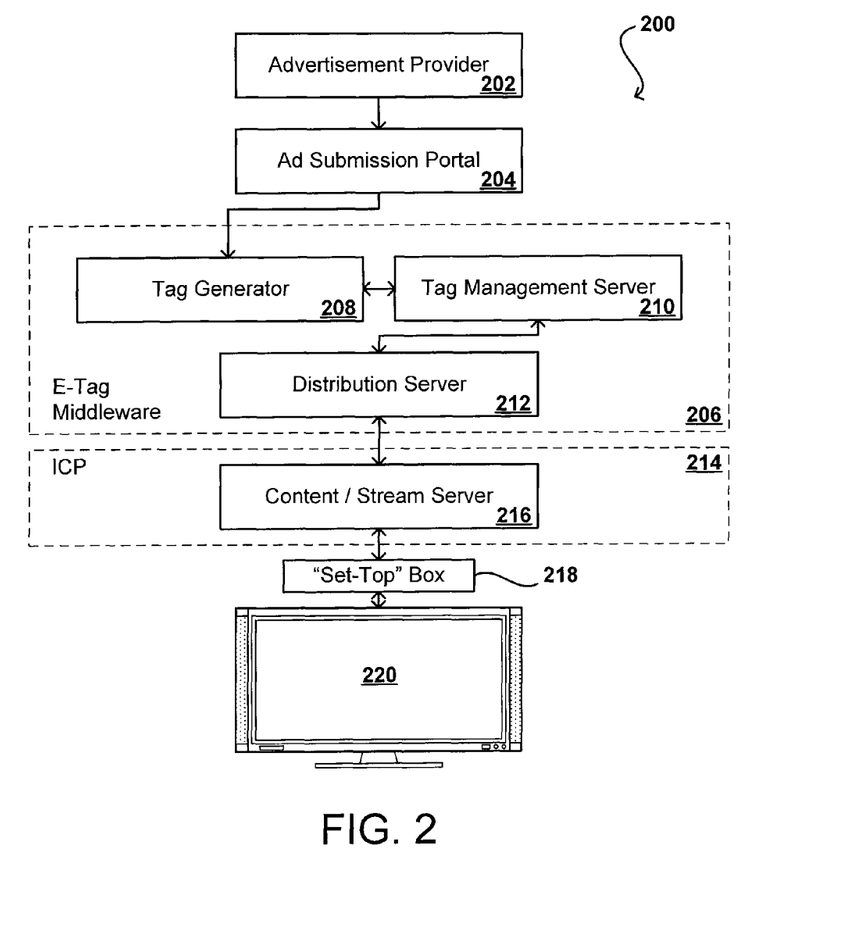
FIG. 2 illustrates a content delivery system that can be used in accordance with one embodiment of the present invention.

For example, FIG. 2 shows a system 200 wherein related content can be added to downloadable or streaming digital content provided by an Internet Content Provider (ICP), although any other such content provider could utilize such a system. As discussed above, the ICP 214 can include multiple content servers 216, such as stream servers capable of streaming digital content. The ICP can also include, or have access to, a number of digital storage mechanisms (not shown), such as databases in a RAID configuration, a direct attached storage (DAS) system, storage area network (SAN), a network attached storage (NAS) system, or any other appropriate data storage mechanism known or used in the art.

In order to provide access to related content for information or content provided by the stream server 216, such a system can include components referred to herein as "e-tag" components which are capable of including "tag" information in the content to be downloaded or streamed by a user, such that an access mechanism is provided along with the content in a related file, or even embedded in the content file itself. For example, an advertisement ("ad") provider 202 might have paid to have a product placed in a movie or television program, and would like to further benefit from that product placement by allowing a viewer to instantaneously be able to obtain additional information or even purchase the product or service being advertised. In such a case, the ad provider 202 will submit information via an ad submission portal 204, the information including, for example, an identification of the content to include in the tag, a time (such as a period of time) during the displaying of the content to provide access to the related content, and an address or mechanism for locating the related content. Although not included in the present description, it should be understood that various payment models can be used that allow an advertiser to select how many related content links to provide, how long a link is provided, etc., as would be apparent to one of ordinary skill in the art.

The ad submission portal 204 can submit the information to an e-tag middleware layer 206, whereby the information can be received by a component such as a tag generator 208. The term "tag" in one embodiment refers to an XML tag of an XML-based tag file that can be added or linked to any content file, such as a digital video media file, such that when the digital media receiving device encounters a tag, the device can display information for the related content. The tag file can also be written in any other appropriate scripting or markup language, and can be indicated using a mechanism other than a tag as would be apparent to one of ordinary skill in the art in light of the teachings and suggestions contained herein. The term "e-tag" simply refers to an electronic tag that can be included in one of these tag files, wherein each such tag can be associated with a link to related content. In one embodiment, each digital file can have associated therewith a single tag file, which can include tag information for a number of products, services, companies, locations, related content, etc., each of which may be totally unrelated to the others.

The tag generator 208 can assemble the information received from the ad submission portal 204 and can generate an appropriate tag that can be added to the tag file for the appropriate content and ultimately interpreted by the digital media receiving device 218. The tag then can be submitted to a tag management server 210, which can insert the tag into the appropriate tag file, and create the tag file if necessary. The tag management server 210 then can write the updated tag file to an appropriate data storage location (not shown). This data storage location can be the same as, or different from, that used to store the digital content. The tag management server 210 also can make this information available to at least one distribution server 212, such as by sending a message to the distribution server or writing information to a data table accessible to the distribution server. The distribution server 212 is in contact with the content servers 216 of the ICP, such that when a user downloads or streams content from the ICP, any information in a tag file associated with that content also can be sent to the user. The tag information can be sent up front and can reside on the media receiving device during playback of the entire content, or can be included and sent with the content (particularly for streaming) around the time that the related content is to be displayed.

The tag information will be received and parsed by a digital media receiving device, such as a set-top box 218 for a television 220. The set-top box, or other digital media receiving device, can include or have access to a client-side application operable to extract the tag information, generate the appropriate access mechanism(s) at the appropriate time(s), and publish the access mechanism(s) for display on the display device. It should be understood that there are a number of other media viewing devices that can display the content as well, such as cellular phones, laptop computers, computer monitors, PDAs, handheld video game systems, portable media players, etc. The digital media receiving devices for each such viewing device may differ, and may be included in, or separate from, the viewing device.

Figure 3:
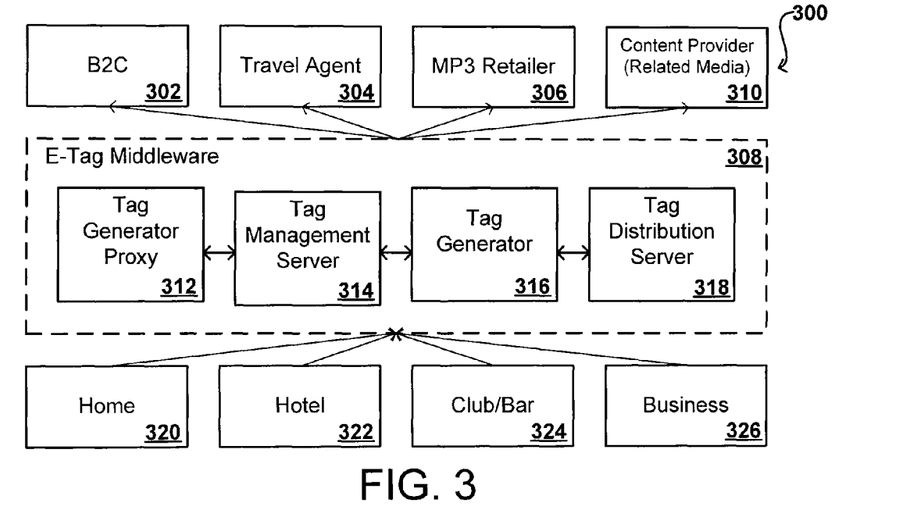
FIG. 3 illustrates a tag middleware component that can be used in accordance with one embodiment of the present invention.

Such an approach can be useful for a number of situations, such as is illustrated in the exemplary arrangement 300 of FIG. 3. Here, it can be seen that a number of users or viewers in a number of different locations, such as at home 320, a hotel 322, a club or bar 324, or a business location 326 can access related content using tags generated by the e-tag middleware 308. These users can obtain access to products in a business to consumer (B2C) application, access to travel information from a travel agent 304, access to music through an MP3 retailer 306, and/or access to other related content from a content provider 310, as well as a large number of other such providers and sources. As discussed above, the e-tag layer can include a tag management server 314, tag generator 316, and tag distribution server 318 for generating, managing, and providing the tags, as well as a tag generator proxy 312 for providing tags on behalf of a provider.

Figure 4A:
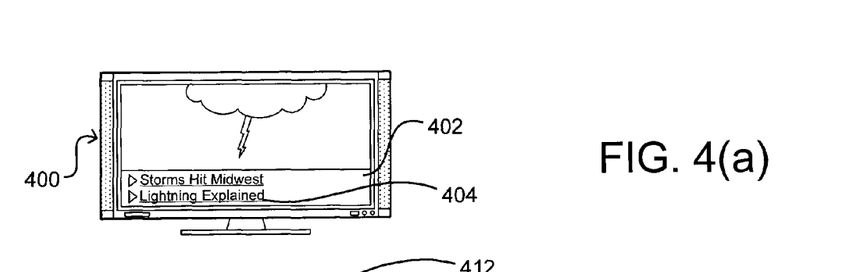
FIGS. 4(a)-4(c) illustrate on-screen displays that can be used with a content delivery system in accordance with one embodiment of the present invention.
Figure 4B:
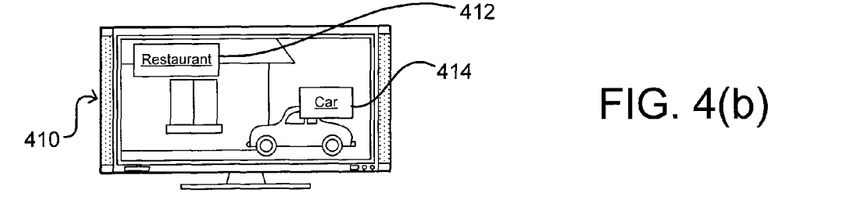

When advertising information is to be displayed to a viewer of the content as indicated in the tag information, a digital media receiving device receiving the tag information can generate an on-screen display to be displayed to the viewer. FIG. 4(a) illustrates an example of an on-screen display 402 in accordance with one embodiment. In this figure, content such as a movie or show is being displayed on a display device 400. When the displayed content reaches a point indicated by the tag information, the on-screen display (OSD) can display selectable elements 404 that can lead the viewer to the related content. This OSD can optionally be displayed all the time, only when selectable elements are available, or not displayed at all, such as may be configured by the user, content provider, etc. When the OSD is always displayed, such as at the bottom of the viewing area as shown, the selectable elements, or even related information that is not selectable, can be scrolled or otherwise displayed throughout the viewing period. Further, the OSD may pop up at specific locations and with specific appearances as indicated by the tag information. For example, FIG. 4(b) illustrates an example wherein a first OSD 412 including a link to the restaurant shown in the scene is shown overtop of the restaurant in the display 410. This OSD also can include information about the restaurant, the restaurant logo, etc. Another OSD 414 might contain information about a car in the scene, and might pop up over the image of the car. These OSDs then might be displayed for an amount of time that depends upon the amount of time the image of the object is on the screen. Each OSD also can be displayed at different and/or overlapping times.

The access element in the OSD can take any form known or used for selecting or accessing content, such as a hyperlink, check box, selectable button, etc. The access element can be selected using any appropriate selection device, such as a remote control, touch screen, keyboard, gaming controller, pointer, or other such device.

Figure 4C:
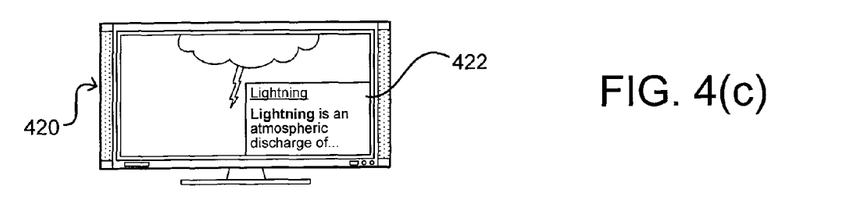

When a user selects an access element, the information associated with the tag can be used by the content servers 216 and/or distribution server 212 to access and display the related content to the user. In some cases, or as configured by the user, the related content might take the place of the currently being displayed content. This is similar to "changing the channel" with current televisions. In other cases, such as is illustrated in the display 420 of FIG. 4(c), the related content might be displayed in the OSD itself, or in another display window 422 for related content. This additional display window can have a size, location, and appearance that is configurable by the user, the content provider, the advertiser, or any other appropriate person. The user also can have the option of moving and/or resizing the additional window. In some embodiments, this window takes the form of a Web browser, which may be customized for the particular user, display device, and/or application.

Figure 5:
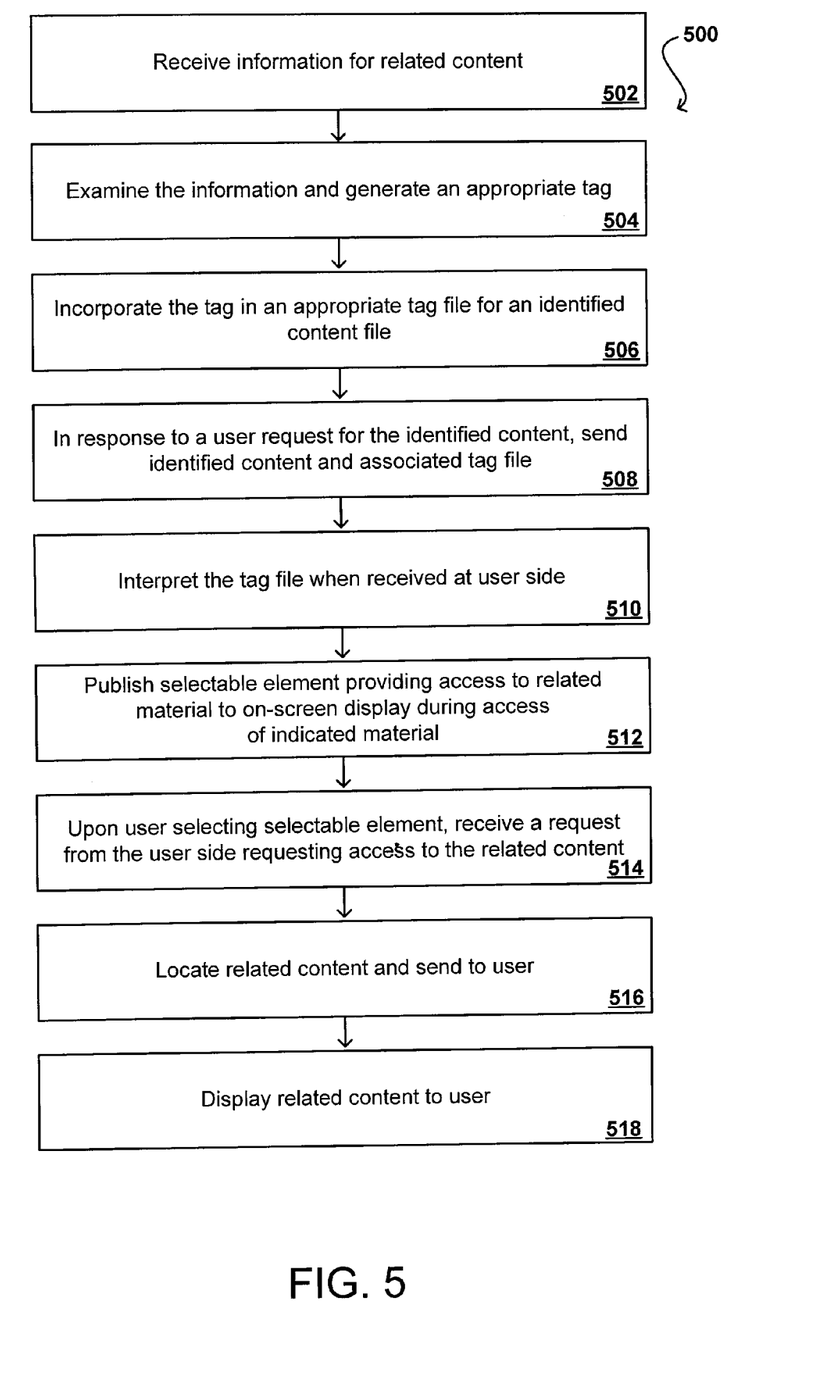
FIG. 5 illustrates steps of a first method for accessing related content using a content delivery system in accordance with one embodiment of the present invention.

FIG. 5 illustrates steps of an exemplary method 500 of providing a user with access to related product information. In this method, information for the related content is received by a tag generator component 502. This information can be received from a advertiser through an ad submission portal, for example, and can identify content with which the related content is to be associated. The tag generator can examine the information and generate the appropriate tag, such as an XML tag for inclusion in an XML tag file 504. A tag manager can ensure that this tag is incorporated in the appropriate tag file for the identified content, and can ensure that the tag file is associated with that content 506. When a user requests the identified content, the identified content along with the associated tag file are sent to the user 508. When the tag file is received by a digital media receiving device for the user, the tag information is interpreted 510. At an appropriate time as identified by the tag information, the digital receiving device publishes information including a selectable element to an on-screen display of the associated display device 512. If the user selects the selectable element, a request is sent back to the content provider, which can use information in the request associated with the selectable element to locate the related content 514. The related content, such as a Web page of the advertiser, then can be sent to the digital media receiving device for display to the user 516. As discussed above, the related content can be displayed in addition to, or in place of, the identified content previously being displayed on the display device.

In other embodiments, the related content might not be provided by advertisers, but by other content providers or even by the ICP or another entity based on information such as keywords for the current content. For example, if a user is viewing a news story on a certain topic, that topic might have keywords associated with it such that related content can be selected and displayed to the user. While watching news relating to a war, for example, tags can be included that cause information to be shown on the OSD such as "Modem Day Warfare" (Program), "Das Boot" (Movie), etc., while allows the user to access the related content similar to selecting a hyperlink to access content. Many techniques for suggesting content based on keywords and other aspects of content, such as for banner ads in a Web page, are known in the art and will not be discussed in detail herein.

Figure 6:
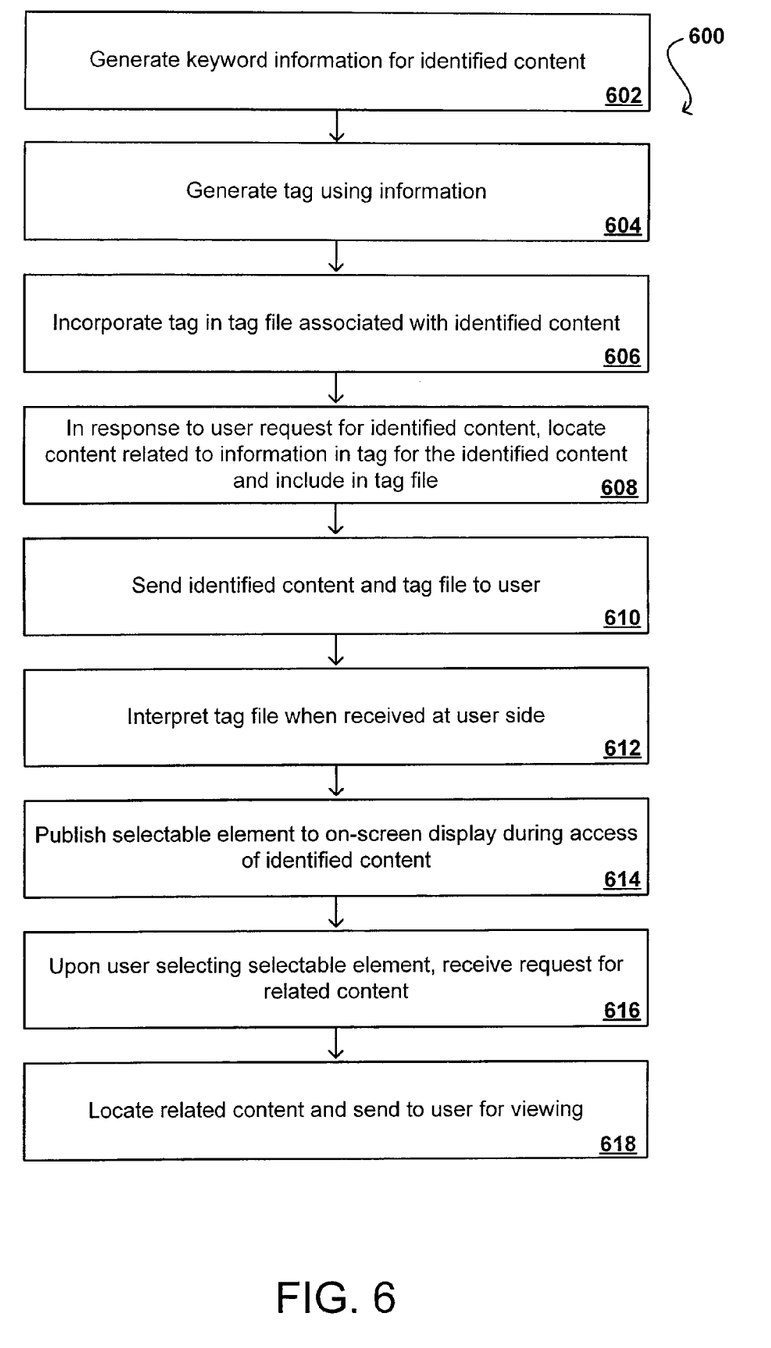
FIG. 6 illustrates steps of a second method for accessing related content using a content delivery system in accordance with one embodiment of the present invention.

FIG. 6 illustrates steps of an exemplary method 600 of providing a user with access to related content. In this method, information such as keyword information or other content descriptors are generated for identified content to be displayed 602. This information can be received from the content provider, can be determined automatically by examining the content, etc. The tag generator can examine the information and generate an appropriate tag 604. A tag manager can ensure that this tag is incorporated in the appropriate tag file for the identified content, and can ensure that the tag file is associated with that content 606. At about the time of a request from a user for the identified content, the tag manager can locate content that is related to the information in the tag(s) for the identified content, and can include related content information in the tags to be sent with the identified content 608. In one example, the tag manager can search specific content categories to see if any related content is sufficiently related to the tag information. For example, if the identified content is related to lightning then the tag manager might search for other content with the keyword "lightning"

and might find a current news story about a storm elsewhere in the country. The tag manager then can include a link to this news story in the tag. When a user requests the identified content, the identified content along with the associated tag file are sent to the user 610. When the tag file is received by a digital media receiving device for the user, the tag information is interpreted 612. At an appropriate time as identified by the tag information, the digital receiving device publishes information including a selectable element to an on-screen display of the associated display device 614. If the user selects the selectable element, a request is sent back to the content provider, which can use information in the request associated with the selectable element to locate the related content 616. The related content, such as a video including the related content, then can be sent to the digital media receiving device for display to the user 618. As discussed above, the related content can be displayed in addition to, or in place of, the identified content previously being displayed on the display device.

It should be understood that mechanisms for suggesting and locating related content are merely exemplary and that many other such approaches can be used within the spirit and scope of the various embodiments.

Exemplary Operating Environments, Components, and Technology

Figure 7:
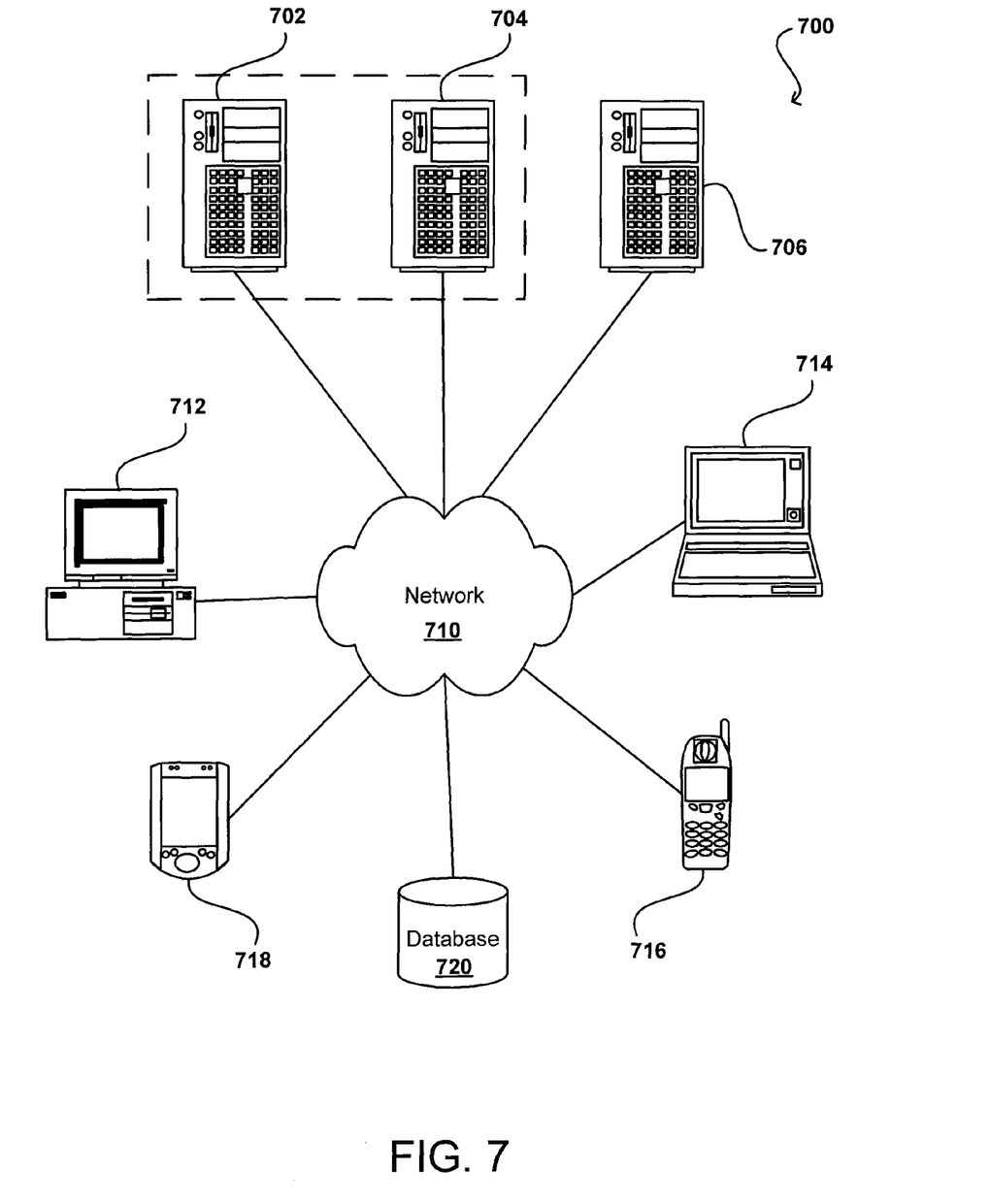
FIG. 7 illustrates components of a computer network that can be used in accordance with one embodiment of the present invention.

FIG. 7 is a block diagram illustrating components of an exemplary operating environment in which various embodiments of the present invention may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10 g, that is adapted to store, update, and retrieve data in response to SQL-formatted commands.

Figure 8:
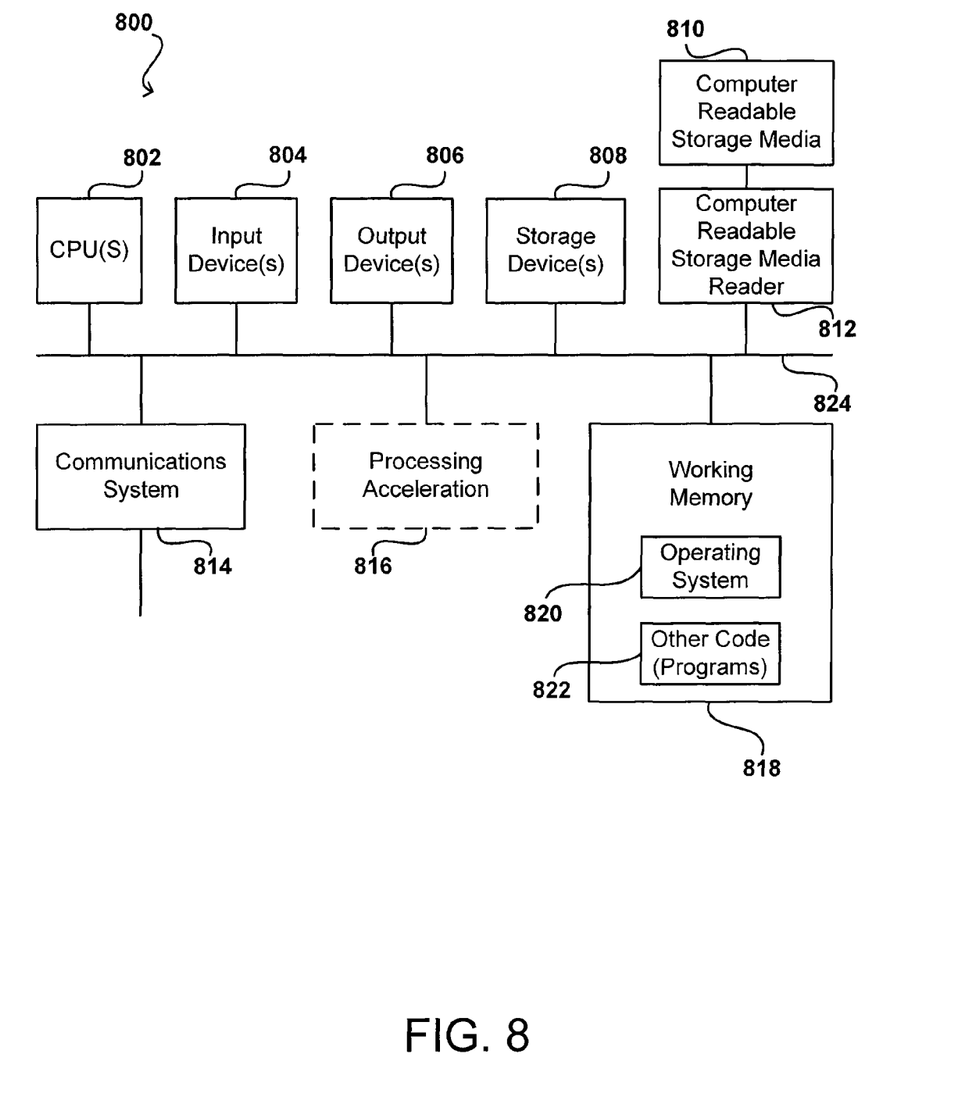
FIG. 8 illustrates components of a computerized device that can be used in accordance with one embodiment of the present invention.

FIG. 8 illustrates an exemplary computer system 800, in which various embodiments of the present invention may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing access to related content in a digital network, comprising:
    generating a set of tags associated with video media content associated with a content provider, wherein
        each tag of the set of tags is associated with a particular portion of the video media content,
        each tag comprises a data structure for storing at least one or more keywords identifying subject matter of the particular portion of the video media content, and
        each tag relates to and defines a selectable element displayable during display of the video media content;
    storing the generated set of tags in a tag file associated with the video media content;
    receiving, from an advertisement provider which is distinct from the content provider, information associated with advertising content related to the video media content, the received information including:
        an identification of the related advertising content,
        a time during the display of the video media content in which the related advertising content is accessible, and
        an address indicating storage location of the related advertising content;
    storing the information associated with the related advertising content received from the advertisement provider in one or more tags in the tag file;
    in response to a request to view the video media content from a receiving device, generating a video stream of the video media content, and delivering the video stream and the tag file associated with the video media content to the receiving device;
    receiving, from the receiving device during display of the video stream, a selection of a particular selectable element;
    generating a request for the related advertising content, the request including the address of the additional content from a particular tag in the tag file associated with the particular selected element;
    in response to determining that a current time during the display of the video media matches the time specified by the received information which enables the related advertising content to be accessed:
        locating the related advertising content identified by the received request using the address included in the request for the related advertising content; and
        delivering the located advertising content to the receiving device in response to the request for the related advertising content, wherein the delivered related advertising content is displayed with the video media content.

2. The method according to claim 1, further comprising: receiving further information for the related advertising content from the content provider.

3. The method according to claim 1, wherein the locating further comprising:
    analyzing the video media content and determining the related advertising content therefrom.

4. The method according to claim 3, wherein:
    the analyzing includes determining at least one keyword for the video media content.

5. The method according to claim 1, wherein:
    the selectable element includes at least one of a hyperlink, network address, selectable button, check box, or radio button.

6. A non-transitory computer-readable storage medium storing instructions, which when executed by one or more processors cause the one or more processors to provide access to related content in a digital network by:
    generating a set of tags associated with video media content associated with a content provider, wherein
        each tag of the set of tags is associated with a particular portion of the video media content, each tag comprises a data structure for storing at least one or more keywords identifying subject matter of the particular portion of the video media content, and each tag relates to and defines a selectable element displayable during display of the video media content;

storing the generated set of tags in a tag file associated with the video media content;

receiving, from an advertisement provider which is distinct from the content provider, information associated with advertising content related to the video media content, the received information including:

an identification of the related advertising content, a time during the display of the video media content in which the related advertising content is accessible, and an address indicating storage location of the related advertising content;

storing the information associated with the related advertising content received from the advertisement provider in one or more tags in the tag file;

in response to a request to view the video media content from a receiving device, generating a video stream of the video media content, and delivering the video stream and the tag file associated with the video media content to the receiving device;

receiving, from the receiving device during display of the video stream, a selection of a particular selectable element;

generating a request for the related advertising content, the request including the address of the additional content from a particular tag in the tag file associated with the particular selected element;

in response to determining that a current time during the display of the video media matches the time specified by the received information which enables the related advertising content to be accessed:

locating the related advertising content identified by the received request using the address included in the request for the related advertising content; and delivering the located advertising content to the receiving device in response to the request for the related advertising content, wherein the delivered related advertising content is displayed with the video media content.

7. The non-transitory computer-readable storage medium according to claim 6, wherein providing access to related content further comprises receiving further information for the related advertising content from the content provider.

8. The non-transitory computer-readable storage medium according to claim 6, wherein the locating further comprises analyzing the video media content and determining the related advertising content therefrom.

9. The non-transitory computer-readable storage medium according to claim 8, wherein the analyzing further comprises determining at least one keyword for a particular portion of the video media content being displayed.

10. A system comprising:

a processor; and a memory coupled with and readable by the processor and storing therein a set of instructions which, when executed by the processor, causes the processor to provide access to related content in a digital network by:

generating a set of tags associated with video media content associated with a content provider, wherein each tag of the set of tags is associated with a particular portion of the video media content, each tag comprises a data structure for storing at least one or more keywords identifying subject matter of the particular portion of the video media content, and each tag relates to and defines a selectable element displayable during display of the video media content;

storing the generated set of tags in a tag file associated with the video media content;

receiving, from an advertisement provider which is distinct from the content provider, information associated with advertising content related to the video media content, the received information including:

an identification of the related advertising content, a time during the display of the video media content in which the related advertising content is accessible, and an address indicating storage location of the related advertising content;

storing the information associated with the related advertising content received from the advertisement provider in one or more tags in the tag file;

in response to a request to view the video media content from a receiving device, generating a video stream of the video media content, and delivering the video stream and the tag file associated with the video media content to the receiving device;

receiving, from the receiving device during display of the video stream, a selection of a particular selectable element;

generating a request for the related advertising content, the request including the address of the additional content from a particular tag in the tag file associated with the particular selected element;

in response to determining that a current time during the display of the video media matches the time specified by the received information which enables the related advertising content to be accessed:

locating the related advertising content identified by the received request using the address included in the request for the related advertising content; and delivering the located advertising content to the receiving device in response to the request for the related advertising content, wherein the delivered related advertising content is displayed with the video media content.

11. The system according to claim 10, wherein providing access to related content further comprises:

receiving further information for the related advertising content from the content provider.

12. The system according to claim 10, wherein the locating further comprises:

analyzing the video media content and determining the related advertising content therefrom.

13. The system according to claim 12, wherein:

the analyzing includes determining at least one keyword for the video media content.

14. The system according to claim 10, wherein:

the selectable element includes at least one of a hyperlink, network address, selectable button, check box, or radio button.

* * * * *

UNITED STATES PATENT AND TRADEMARK OFFICE
CERTIFICATE OF CORRECTION

PATENT NO. : 9,015,179 B2  
APPLICATION NO. : 11/745353  
DATED : April 21, 2015  
INVENTOR(S) : Xiaolu et al.

Page 1 of 1

It is certified that error appears in the above-identified patent and that said Letters Patent is hereby corrected as shown below:

In the specification

Column 6, line 41, delete ""Modem" and insert -- "Modern --, therefor.

Column 7, line 66, delete "GRPS," and insert -- GPRS, --, therefor.

Signed and Sealed this
Ninth Day of February, 2016

Michelle K. Lee
*Director of the United States Patent and Trademark Office*